(12) United States Patent
Langley et al.

(10) Patent No.: US 11,887,315 B2
(45) Date of Patent: Jan. 30, 2024

(54) METHOD AND APPARATUS FOR TRACKING AN OBJECT

(71) Applicant: Phase Focus Limited, London (GB)

(72) Inventors: Kevin Langley, Sheffield (GB); Matthew Stagg, Sheffield (GB); James Russell, Sheffield (GB)

(73) Assignee: Phase Focus Limited, London (GB)

( * ) Notice: Subject to any disclaimer, the term of this patent is extended or adjusted under 35 U.S.C. 154(b) by 316 days.

(21) Appl. No.: 17/311,301

(22) PCT Filed: Dec. 4, 2019

(86) PCT No.: PCT/GB2019/053428
§ 371 (c)(1),
(2) Date: Jun. 4, 2021

(87) PCT Pub. No.: WO2020/115480
PCT Pub. Date: Jun. 11, 2020

(65) Prior Publication Data
US 2021/0374383 A1   Dec. 2, 2021

(30) Foreign Application Priority Data
Dec. 7, 2018  (GB) ..................................... 1820003

(51) Int. Cl.
*G06T 7/246*  (2017.01)
*G06V 20/64*  (2022.01)
*G06F 18/231* (2023.01)
*G06F 18/2113* (2023.01)

(52) U.S. Cl.
CPC .......... *G06T 7/246* (2017.01); *G06F 18/2113* (2023.01); *G06F 18/231* (2023.01); *G06V 20/64* (2022.01)

(58) Field of Classification Search
None
See application file for complete search history.

(56) References Cited

U.S. PATENT DOCUMENTS

| 2017/0336439 A1* | 11/2017 | Li ........................ G01S 5/0294 |
| 2020/0074673 A1* | 3/2020 | Gupta ................... G06F 18/214 |
| 2021/0374383 A1* | 12/2021 | Langley .................. G06T 7/246 |

FOREIGN PATENT DOCUMENTS

CN   108665483 A   10/2018

OTHER PUBLICATIONS

M. A. A. Dewan, M. O. Ahmad, Tracking Biological Cells in Time-Lapse Microscopy: An Adaptive Technique Combining Motion and Topological Features, IEEE Transactions on Biomedical Engineering, vol. 58, No. 6, Jun. 2011, pp. 1637-1647. https://ieeexplore.ieee.org/stamp/stamp.jsp?arnumber=5703117 (Year: 2011).*

(Continued)

*Primary Examiner* — Tahmina N Ansari
(74) *Attorney, Agent, or Firm* — Barnes & Thornburg LLP

(57) ABSTRACT

There is provided a computer-implemented method and apparatus for determining temporal behaviour of an object. The method comprises receiving track data indicative of a plurality of tracks. Each track identifies an association between features corresponding to an object in each of a plurality of images forming image data representative of one or more objects. The method further comprises identifying, in at least some of the plurality of tracks, one or more faults, wherein each fault is associated with at least one respective fault image of the image data. The method further comprises iteratively performing a correction process on the track data. The correction process comprises selecting one of the plurality of tracks having a fault identified therein; determining one or more candidate features in each respective fault image, wherein each candidate feature is determined as a candidate for correcting at least one fault associated with one or more of the plurality of tracks; determining one or more candidate corrections for the selected track, wherein at least some of the candidate corrections are associated with (Continued)

one or more of the candidate features; selecting one of the candidate corrections for the selected track in dependence on a metric indicative of an effect of the candidate correction on the plurality of tracks; and applying the selected candidate correction to the selected track in dependence on one or more criteria.

19 Claims, 13 Drawing Sheets

(56) References Cited

OTHER PUBLICATIONS

European Patent Office, International Search Report for PCT/GB2019/053428, dated Feb. 25, 2020, 4 pages.
European Patent Office, Written Opinion for PCT/GB2019/053428, dated Feb. 25, 2020, 7 pages.
United Kingdom Intellectual Property Office, Search Report for GB1820003.0, dated Jun. 3, 2019, 3 bages.
M. Dewan et al., "Tracking Biological Cells in Time-Lapse Microscopy: An Adaptive Technique Combining Motion and Topological Features," IEEE Transactions on Biomedical Engineering, IEEE Service Center, Piscataway, NJ, USA, vol. 58, No. 6, Jun. 1, 2011 (Jun. 1, 2011), p. 1637-1647.
A. Santella et al., "A semi-local neighborhood-based framework for probabilistic cell lineage tracing," BMC Bioinformatics, Biomed Central, London, GB, vol. 15, No. 1, Jun. 25, 2014 (Jun. 25, 2014), pp. 217-224.
J. Xie et al., "Automatic Tracking of *Escherichia coli* in Phase-Contrast Microscopy Video," IEEE Transactions on Biomedical Engineering, IEEE Service Center, Piscataway, NJ, USA, vol. 56, No. 2, Feb. 1, 2009 (Feb. 1, 2009), pp. 390-399.

* cited by examiner

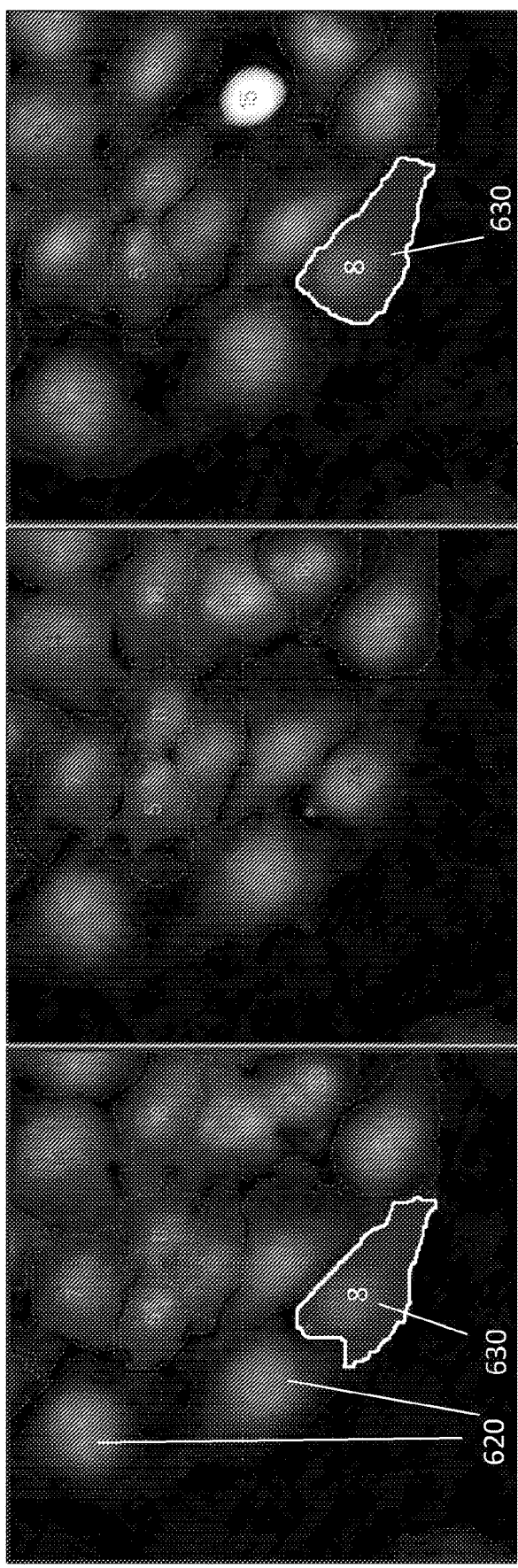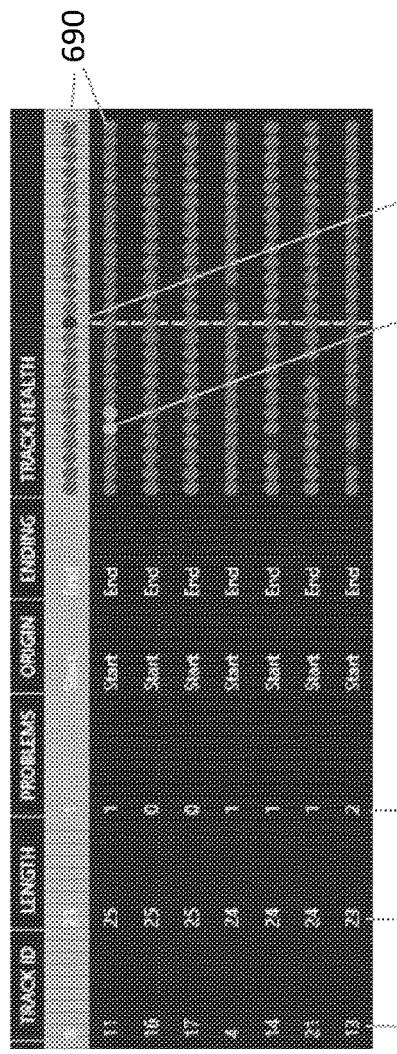
Fig. 6a
Fig. 6b (a)

(b)

METHOD AND APPARATUS FOR TRACKING AN OBJECT

CROSS-REFERENCE TO RELATED APPLICATIONS

This application is a national stage entry under 35 U.S.C. § 371 of PCT International Application No. PCT/GB2019/053428, filed Dec. 4, 2019, which claims priority to Great Britain Patent Application No. 1820003.0, filed Dec. 7, 2018. The entire disclosures of the foregoing applications are incorporated herein by reference.

TECHNICAL FIELD

Embodiments of the invention relate to a method and apparatus for determining the temporal behaviour of an object. In particular, some embodiments of the present invention relate to correcting faults in track data relating to an association between features in each of a plurality of images forming image data representative of one or more objects.

BACKGROUND

Identifying objects between frames in a time-lapse sequence of images is a recognised challenge in image processing. In certain embodiments, such as tracking cells in an in-vitro cell culture, this can be made more difficult by the object's characteristics, which may change over time. When tracking an object between frames it may not be possible to track the object in at least some of the frames. For example, it may not be possible to distinguish, with certainty, the tracked object from other objects in at least some of the frames.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which:

FIG. 6a is example images comprising a number of features corresponding to objects;

FIG. 6b is an illustration of track data metrics illustrating a fault in track data;

DETAILED DESCRIPTION OF EMBODIMENTS OF THE INVENTION

Embodiments of the invention are arranged to determine a temporal behaviour of an object. In particular, some embodiments of the invention are arranged to track objects over a period of time. Embodiments of the invention may be useful for tracking any objects visible in image data, such as aircraft or people. Embodiments of the invention will be illustrated with reference to tracking of objects in a container. The objects may be immersed or suspended in a liquid medium within the container. The objects may be cells, with it being appreciated that this is not limiting.

Figure 1:
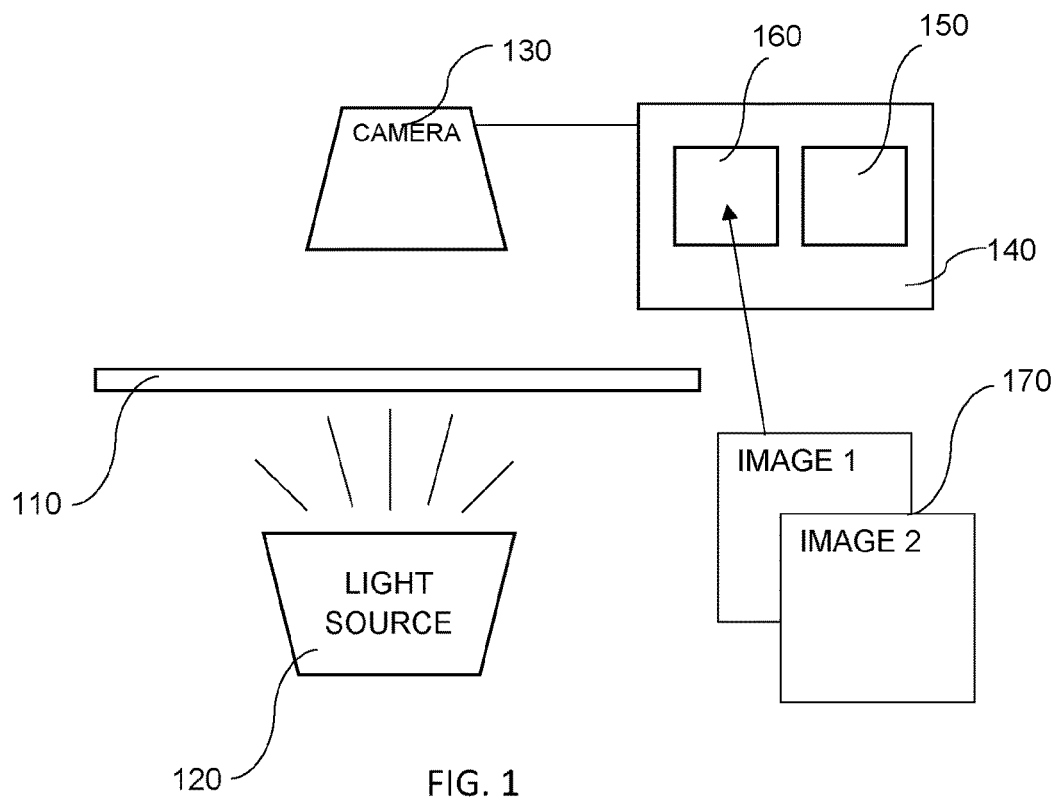
FIG. 1 is a diagram showing an apparatus according to an embodiment of the invention.

FIG. 1 is a diagram of an apparatus which may be used with embodiments of the invention. The apparatus provides image data relating to one or more objects as will be explained. Whilst the apparatus is described as having a certain structure it will be appreciated that this is not limiting, and that other apparatus may be used with embodiments of the invention.

The apparatus comprises a mounting means or apparatus 110 for supporting one or more objects in use. The mounting means 110 may comprise a slide, stage petri dish or micro-titre plate 110, upon which one or more objects are located in use. The mounting means 110 is suitable to retain the one or more objects including, in some cases, a liquid medium in which those objects, such as cells, reside.

A light source 120, or other radiation source, is used to illuminate the mounting means 110, and is located such that the radiation/light is transmitted through or reflected from the mounting means 110 and is detected by a detector 130 for detecting incident radiation. The detector 130 may be provided in the form of an image detection means 130. The image detection means 130 may be a CCD forming a camera or imaging device 130. The image detection means 130 is arranged to output a plurality of images of the mounting means 110 over a period of time. The image detection means 130 is connected to a computing device 140. The image detection means 130 is arranged to output image data corresponding to each of the plurality of images. The computing device 140 comprises a CPU 150 and memory 160. Images captured by the image detection means 130 are stored in the memory 160 of the computing device 140 and as time progresses an image sequence 170 is created.

Figure 2:
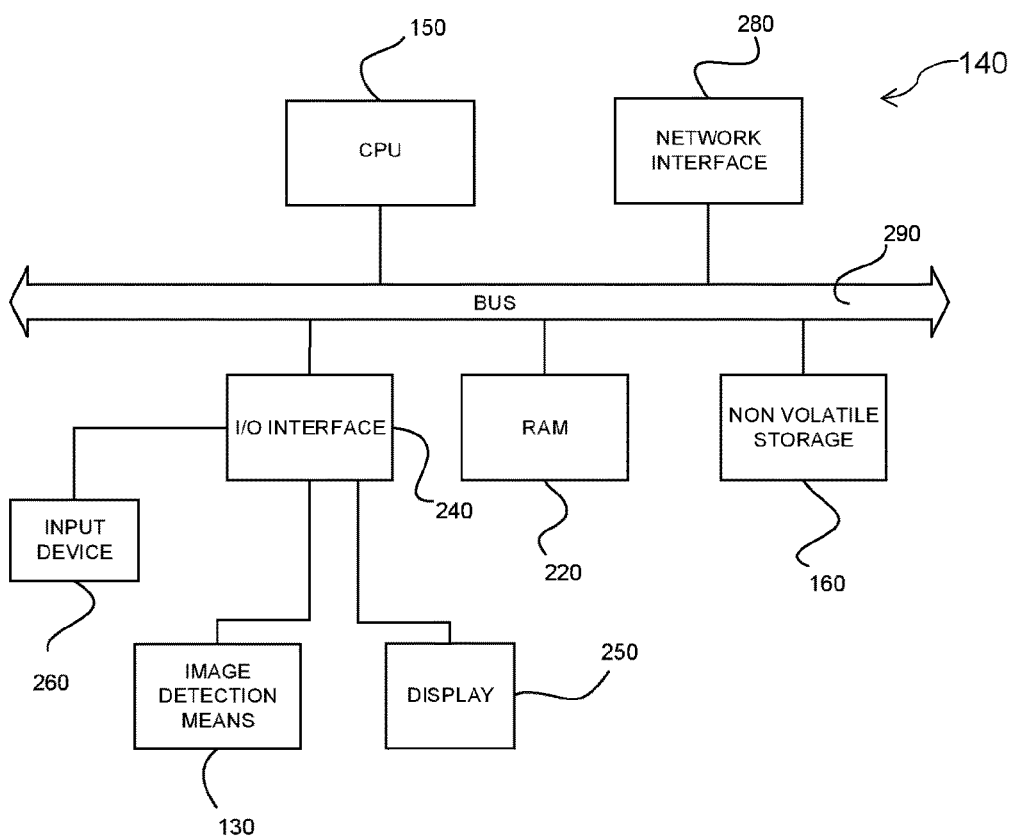
FIG. 2 is a diagram showing a further illustration of an apparatus according to an embodiment of the invention.

An example of components of the computing device 140 is now further described with reference to FIG. 2. It will be appreciated that the components of the computing device 140 in FIG. 2 are merely exemplary and the computing device 140 may comprise other components. As previously noted, the computing device 140 comprises a CPU 150 which is configured to read and execute instructions. The instructions may be stored in volatile memory 220 which may take the form of random access memory. The volatile memory 220 may store instructions for execution by the CPU 150 and data used by those instructions. In the present embodiment, the instructions stored in the volatile memory 220 are arranged to cause the CPU 150 to run a method to determine the temporal behaviour of an object according to an embodiment of the invention.

The computing device 140 further comprises the memory 160 as noted above. The memory 160 may take any appropriate form, such as a solid state drive ('SSD'), or hard disk drive ('HDD'). However it will be appreciated that other forms of memory may be appropriate.

The computing device 140 may further comprise an I/O interface 240 to which are connected input and output devices used in connection with the computing device 140.

A display 250 may be provided to show visual outputs of the method. Input devices connected to the I/O interface 240 may include physical keys 260 which allow user interaction with the computing device 140. Alternatively or additionally, the display 250 may provide a touchscreen allowing a user to interact with the user interface displayed on the touchscreen. The image detection means 130 is connected to the I/O interface 240 allowing image data to be communicated to the computing device 140. In particular, the image detection means 130 allows for the image data of the slide 110 to be captured by the computing device 140 for use in the method. A network interface 280 may be provided allowing the computing device 140 to be connected to an appropriate computer network so as to receive and transmit data from and to other computing devices. In this way, the computing device 140 may receive updates or further information for use in the method. The CPU 150, volatile memory 220, memory 160, I/O interface 240, and network interface 280 are connected together via a bus 290.

In certain embodiments of the invention the image data may be generated by a number of methods, one such method being the ptychographical iterative engine (PIE). WO 2005/106531, which is incorporated herein by reference for all purposes, discloses a method and apparatus of providing image data for constructing an image of a region of a target object. Incident radiation is provided from a radiation source at the target object. An intensity of radiation scattered by the target object is detected using at least one detector. The image data is provided responsive to the detected radiation. A method for providing such image data via an iterative process using a moveable softly varying probe function such as a transmittance function or illumination function is also disclosed. The methods and techniques disclosed in WO 2005/106531 are referred to as a PIE.

PIE provides for the recovery of image data relating to at least an area of a target object from a set of diffraction pattern measurements. Several diffraction patterns are recorded at a measurement plane using one or more detectors, such as a CCD or the like. A probe function, which might be a transmittance function associated with a post-target object aperture or an illumination function, must be known or estimated.

WO 2010/064051, which is incorporated herein by reference for all purposes, discloses an enhanced PIE (ePIE) method wherein it is not necessary to know or estimate the probe function. Instead a process is disclosed in which the probe function is iteratively calculated step by step with a running estimate of the probe function being utilised to determine running estimates of an object function associated with a target object.

Other methods of providing image data based on measurement of scattered radiation are also known.

Figure 3:
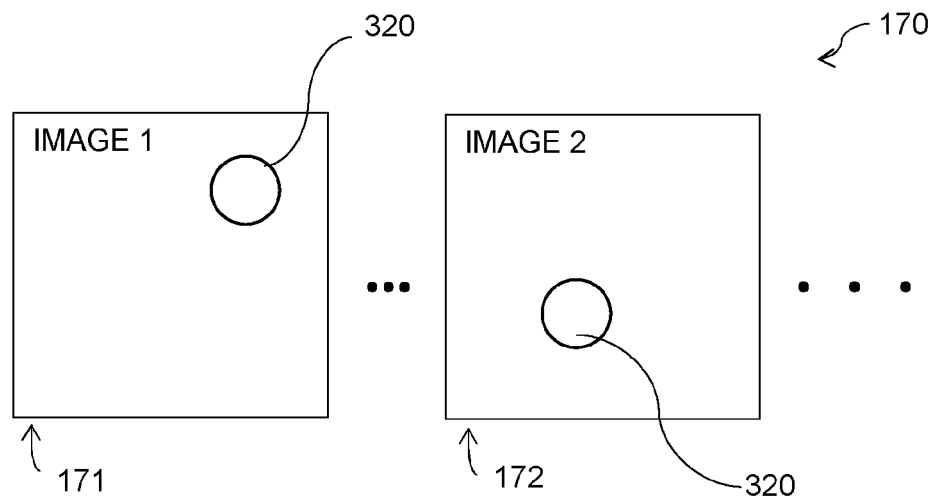
FIG. 3 is an illustration of a sequence of images generated by the apparatus of FIGS. 1 and 2.

FIG. 3 is a representation of the image sequence 170. The image sequence 170 comprises a plurality of images 171, 172 generated by the image detection means 130 each corresponding to a respective point in time. In the example, an image may be understood to be a representation of image data corresponding to a two-dimensional picture of at least a portion of the mounting means 110 and any objects present thereon or therein at a point in time. A plurality of images 171, 172 corresponding to respective points in time represent an image sequence 170 over a period of time, wherein the period of time is between the points in time of the first and last images in the sequence. Usually, although not exclusively, the images correspond to equally spaced points in time. A frame is synonymous with the term image, particularly when the sequence of images is considered to be a video sequence comprised of a plurality of frames or images.

A feature is an entity present in an image. The feature may or may not correspond to an object. For example, a feature may correspond to an artefact present in the image which is not an object. Each feature may correspond to a region of the image identified using one or more identification algorithms or techniques. A feature may be identified using a segmentation algorithm which identifies features in the image according to their characteristics, such as a colour of pixels in the image corresponding to the feature compared to pixels representing a background of the image. The segmentation algorithm may identify features in the image using a seedpoint, which is a pixel used as a starting pixel for the segmentation algorithm. The seedpoint may be identified by finding a pixel having one or more characteristics in the image such as intensity and/or colour. The segmentation algorithm may be a flood-based segmentation algorithm which identifies an area of the feature in the image by 'flooding' outward from the seedpoint, although it will be appreciated that other types of segmentation algorithm may be used. Flooding may be considered as determining the area of the feature by finding pixels adjacent to the seedpoint having one or more characteristics in the image such as intensity and/or colour, as would be understood by the skilled person. An extent of the feature in the image is determined once pixels are encountered which do not have, or lack, the one or more characteristics in the image such as intensity and/or colour. For example, the feature may correspond to an area in the image having at least a predetermined brightness, where the image background corresponds to darker pixels as shown in FIG. 6a. Thus each feature may be determined to have an outline or periphery corresponding to an extent of the identified pixels in the image. In this way, the feature is identified in the image. It will be appreciated that in some images a plurality of features may be identified and each feature may be associated with a respective identifier, such as a respective number.

Each feature has one or more characteristics, such as one or more of a pixel value sum, an area, a volume, an average pixel value, a radius, a circularity, a lateral position and texture characteristics of the feature. The texture characteristics may be one or more of variance, curtosis and wavelet characteristics. It will be appreciated that other characteristics may be used. An association between features in a plurality of images may be determined based on the one or more characteristics, such as described in WO 2016/174472 which is herein incorporated by reference.

An object is a real-world object which it is desired to monitor over the period of time corresponding to the image data. The object may be, although not exclusively as noted above, a biological cell. The object may be a colony of cells i.e. two or more cells. The object may alternatively be a sub-cellular feature. An object may be uniquely identified such that each of a plurality of cells may be individually monitored in the sequence of images over the period of time. At least some features present in each image correspond to real-world objects. Although objects may enter and leave an area of the image, it is expected that whilst in the area of the image it is possible to track the object over a duration of time of the image data. That is the object should be tracked unless the object becomes obscured by another object(s) or, in the case of biological objects, dies or undergoes mitosis to form two or more biological objects, such as cells. Therefore, for the most part, it is expected to be possible to identify a feature in each image of the image data corresponding to each object for which the object is present. That is, it is generally expected that an object is continuously visible in the image data and does not disappear and re-appear in images (unless the object is obscured) as will be discussed below. Therefore, for each image between an object entering the image data and leaving the image data either by leaving a field of view, dying or dividing (it will be appreciated that objects do not always enter and/or leave the image data during the period of time), there should be a feature corresponding to each object.

Referring to FIG. 3, the image sequence 170 contains images 171, 172 of the mounting means 110 which retains at least one object 320. Each image 171, 172 of the image sequence shows the object 320 on the slide 110 at a particular, respective, point in time. The object 320 may vary between images in one or more of position, size, texture, and colour as the image sequence 170 progresses. For example, as shown in FIG. 3, the object's 320 position is different in first and second images 171,172 of the sequence 170. It will be noted that the first and second images are not necessarily sequential or adjacent images in the sequence 170. It will be appreciated that a number of other characteristics of objects on the mounting means 110 may vary between images of the image sequence 170.

Figure 4:
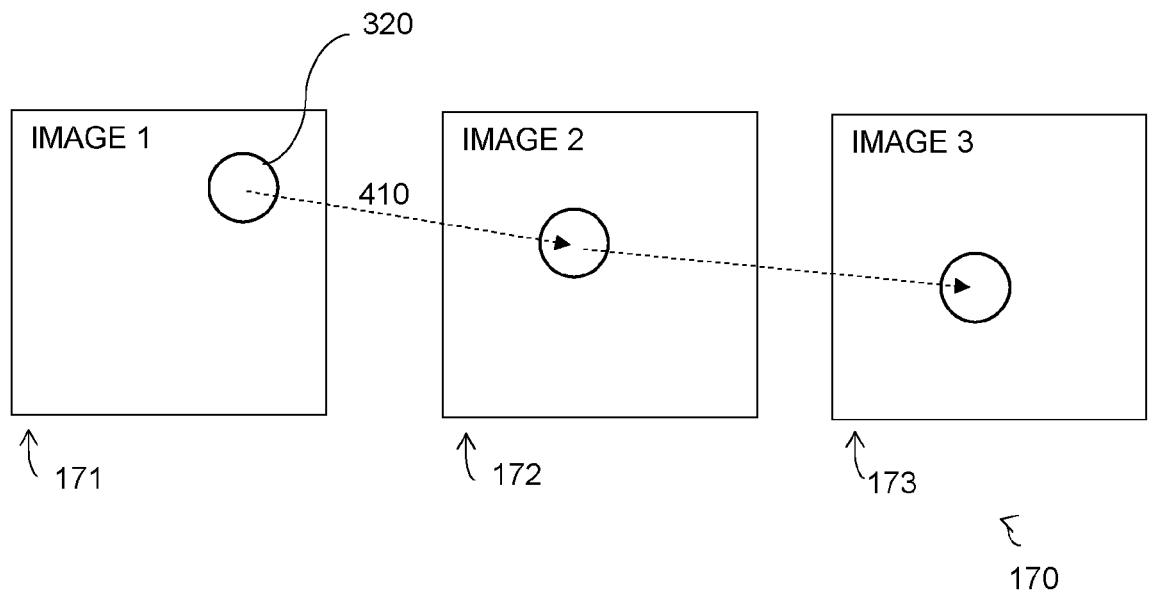
FIG. 4 is an illustration of a sequence of images generated by the apparatus of FIGS. 1 and 2.

A method of tracking objects may be applied to the image sequence 170 to determine track data. The track data comprises data indicative of one or a plurality of tracks. Each track identifies an association between a feature in each image 171, 172, 173 corresponding to the object 320, as shown in FIG. 4. That is, the tracking method aims to uniquely identify respective objects in each image 171, 172 of the sequence of images 170 such that the location of each respective object can be uniquely identified in each image 171, 172.

FIG. 4 illustrates three images 171, 172, 173 in which the object 320 is imaged. As can be appreciated, one or more of the object's characteristics changes between each image, the characteristics including particularly a location of the object 320 within the images but may also include the object's size and shape, amongst other characteristics. As described above, a feature is identified in each image 171, 172, 173 which are determined to correspond to the same object 320 based on the one or more characteristics of the feature in each image. That is, a confidence value is determined indicative of a likelihood of the features in the respective images being associated. It is desired that, generally in most cases as discussed above, features are continuously associated in a plurality of adjacent images of the image data to form a track.

A track 410 links a feature in each image corresponding to the object 320 to enable to object to be tracked, or followed, through the image sequence 170 or at least while the object is still visible in the image sequence 170. A track therefore comprises information identifying a plurality of features, each feature in a respective one of a plurality of images forming image data, where the features are representative of the object 320 over the period of time corresponding to the plurality of images. Track data may comprise data indicative of a plurality of tracks, where each track corresponds to a respective object. Thus the track data may track or follow each of a plurality of objects, such as cells, over a period of time.

However, a fault may occur with respect to one or more images which prevent an association with features in adjacent images. As a result of the fault the track may be incomplete. That is, the track does not track the object throughout the sequence of images 170 in which the object 320 is visible i.e. there is a 'gap' in the track of one or more images where a feature corresponding to the object 320 is not found in the one or more images, even though the object 320 should still be visible in the one or more images (the object not having left a field of view of the imaging device 130 or having been obscured). Embodiments of the present invention are applicable to track data to improve a tracking of objects. That is, embodiments of the present invention may reduce a number of faults present in the track data, as will be explained.

Figure 5:
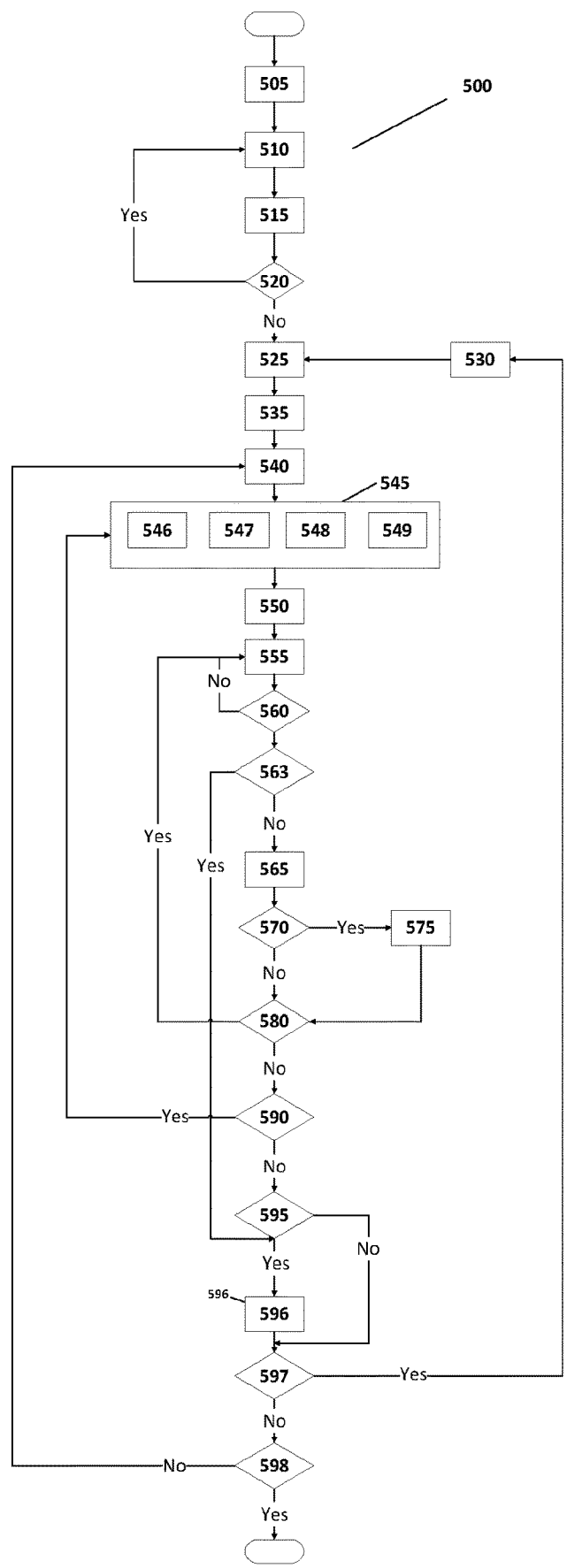
FIG. 5 is a flowchart illustrating a method according to an embodiment of the invention with portions of the overall flowchart illustrated separately in FIGS. 5a-5c.

FIG. 5 illustrates a method 500 according to an embodiment of the invention. An index for the reference numerals illustrated in FIG. 5 is appended at the end of the detailed description. The method 500 is a computer-implemented method 500 of determining temporal behaviour of an object. The method 500 may be performed by an electronic processor, such as the CPU 150, executing computer-readable instructions which are stored in a data storage medium, such as one or more memory devices, accessible to the processor, such as the memory 160. It will be appreciated that the method 500 may be performed by another computing apparatus than that illustrated in FIGS. 1 and 2 which is arranged to receive data from the apparatus of FIGS. 1 and 2.

The method 500 comprises a step 505 of receiving track data. The track data comprises data indicative of a plurality of tracks, where each track corresponds to a respective object. The track data may be stored in the memory accessible to the processor. The track data may be associated with a sequence of images forming image data which may correspond to a video. The sequence of images may comprise, for example, 100 images or frames over a period of time such as 4 seconds corresponding to a video at 25 frames per second (fps). It will be appreciated that these figures are only for illustration and are not restrictive.

Steps 510-540 represent pre-processing of the track data prior to iteratively performing a correction process on the track data as will be explained. In steps 510-520 any faults associated with each of the plurality of tracks are determined.

In step 510 one of the plurality of tracks is selected. In some embodiments, the track may be randomly selected. In other embodiments, the track may be selected based on one or more predetermined criteria. For example, the track may be selected according to an identifier associated with each of the plurality of tracks, such as an ID number. In one embodiment, an unprocessed track having a lowest ID number is selected in each iteration of step 510.

In step 515 any faults associated with the selected track are identified. A fault may be identified as the track not having an associated feature in one or more images. The one or more images with which the fault is associated are referred to as fault images. The one or more images may be at a start or end of the track, which may be referred to as invalid termination faults such as an invalid start state fault or an invalid end state fault. At least some of the fault(s) may be associated with intermediate images in the sequence of images. For example, the selected track may not be associated with a feature in one image or a plurality of adjacent or consecutive images, which may be referred to as a missing frame fault. In some embodiments, a missing frame fault may relate to the track not being associated with a feature in one image. In some embodiments, a multiple frame fault may relate to the track not being associated with a plurality of consecutive images. It will be appreciated that the above list of faults is merely an example and is not exhaustive i.e. other faults may be identified. In some cases, a feature may be present in an image and still be identified as being a fault associated with a track. For example, a feature may be identified in an image as a fault based on one or more characteristics of the feature, such as in dependence on a geometry of the feature, or on a quality of association or link with the feature and a preceding and/or following feature in an adjacent image. In some embodiments, such faults where the fault is associated with a feature present in an image, rather than being absent, may be termed warnings. An output may be provided indicative of the warning, as discussed below. Thus, in some embodiments, a type of each fault is determined in step 515.

FIG. 6a shows three consecutive images 611, 612, 613 in each of which a plurality of features 620 have been identified. A selected track having an ID number of #8 is associated with a first feature 630 (shown highlighted) in the first image 611 and the third image 613. The selected track comprises a fault in that the track is not associated with a feature in the second image 612. Thus, the track has a missing frame fault in some embodiments. The second image 612 is a fault image for the track #8. It will be appreciated that for other tracks the second image 612 may not be a fault image.

In step 520 it is determined whether any tracks remain which have not been considered in step 515. If so, the method 500 returns to step 510 where a next track is selected. If not, the method progresses to step 525.

As a result of steps 510-520 any faults associated with each of the plurality of tracks are identified and, in some embodiments, a type of each fault is ascertained.

In step 525 a metric indicative of a quality of each track of the plurality of tracks is determined. The metric may be indicative of a number of faults associated with each track. The metric may also account for a length or duration of each track. Advantageously the metric accounting for both the number of faults and length of the track allows identification of tracks according to quality, as explained below.

In some embodiments, the metric is known as a track health H metric which may be calculated as:

$$H = \frac{F}{L}$$

Where F is a number of faults associated with the track and L is a length of the track which may be a number of images associated with the track. The number of images may be a total number between a first image and a last image associated with the track. Thus, for the example in FIG. 6a, the total number of images is three even though the second image is not associated with a respective feature. Therefore, for the example of FIG. 6a, the track has a metric of H=0.33 (⅓). In step 550 the metric is calculated at least for those tracks having one or more faults associated therewith, and in some embodiments for each of the plurality of tracks.

In other embodiments, the metric may be calculated as:

$$H = L - F$$

where L is a length of the track which may be a number of images associated with the track and F is a number of faults associated with the track.

The value of H may be used in a subsequent step 535 to sort the plurality of tracks. However, where at least some of the plurality of tracks have the same value of H, a tie break method may be employed. In some embodiments each type of fault is assigned a weight value which are used to break the tie caused by the tracks having the same value of H, such that the tracks may be numerically sorted. The weighting may be considered as a second metric H' which is equal to a sum of fault weights associated with the track. The plurality of tracks may be sorted, first, by H, then secondly by H'. Other tie break methods may be used as appropriate.

In some embodiments, the metric may also include an offset value. The offset value may be used in some embodiments to allow consideration of tracks in certain circumstances to be delayed, as will be explained.

FIG. 6b illustrates data associated with a plurality of tracks 690. As can be seen each track is associated with a respective identifier 691, such as a numerical value. Each track is also associated with data indicative of a length 692 of each track in terms of a number of images and a number of faults 693 associated with each track.

As shown in FIG. 6b, for each of the plurality of tracks, faults are identified which are associated with respective images in the sequence of images. Reference 694 indicates an image associated with track #8 having a fault. As shown in FIG. 6b some tracks, such as track #13, are associated with a plurality of faults. The image associated with the fault 694 is shown in image 612 of FIG. 6a, with the adjacent images either side shown as 611, 613. Reference 695 indicates an image associated with track #11 having a warning i.e. where a feature is present in the image, but the warning is indicative of an identified issue with the feature.

In step 535 the plurality of tracks for which the metric has been calculated are sorted or ordered according to the metric. In some embodiments, the plurality of tracks are sorted according to the value of H associated with each track. The tracks are sorted such that higher quality tracks are provided for selection first in step 540. Thus, in the example of FIG. 6b, tracks #16 & #17 having length 25 and no faults would be deemed highest quality followed by track #8 having length 25 and one fault. In some embodiments, in step 535 tracks not having any faults associated therewith are discarded in step 540 as it may be deemed unnecessary to consider tracks not having any faults.

As a result of step 535 the plurality of tracks may be ordered in dependence on the value of H. Furthermore, as mentioned above, the plurality of tracks may be sorted according to the value of H and a type of fault associated with each track i.e. such that tracks being associated with less significant faults (better quality tracks) are provided for selection first.

In step 540 a track is selected. The track is selected according to the metric i.e. in dependence on H in some embodiments, and in other embodiments also according to the type of fault. The track is selected in dependence on the sorting performed in step 535. In a first iteration of step 540 a first track having highest quality and having at least one fault associated therewith is selected. The selection of tracks in this way advantageously directs the iterative correction process towards tracks having fewest problems first and likely the least number of potential corrections to thereby enable these faults to be addressed more quickly to potentially improve the quality of other tracks in collateral, as will be explained.

In step 545 one or more candidate features are determined. One or more candidate features are determined for each respective fault. The one or more candidate features may be determined in at least one fault image i.e. the image(s) associated with the fault. Each candidate feature is a candidate for correcting the fault associated with the selected track with respect to the at least one fault image. For the second image 612 as the fault image the one or more candidate features are identified in the second image 612 as one or more features which may be the highlighted feature in the first and third images 611, 613.

The one or more candidate features may be existing features in the fault image(s), new features identified in the fault image(s), or may be determined in dependence on one or more existing features. The candidate feature may be formed by an amalgamation of two or more existing features i.e. two or more features being joined or merged together, or can be formed by splitting an existing feature into two or more features, wherein at least one of the two or more features is a candidate feature.

In some embodiments, step 545 comprises determining an expected feature for the fault. The expected feature is a feature which it is expected would correct the fault associated with the selected track. In some embodiments the expected feature is determined in dependence on images either side of the one or more fault images. In the example of FIG. 6(*a*) the first and third images 611, 613 are used to determine the expected feature. The images used may be the one or both images immediately adjacent the one or more fault images i.e. images immediately preceding and/or following the one or more fault images.

The expected feature may be determined in dependence on one or more characteristics of the feature associated with the selected track in the images at one or either side of the one or more fault images. The one or more characteristics of the feature in the images either side of the one or more fault images may be interpolated to determine the one or more expected characteristics of the feature in the one or more fault images. If there is one fault image, the interpolation may be evenly weighted i.e. 50% of a difference of the characteristic in the adjacent non-fault images, whereas when there are two or more fault images, the characteristic of the interpolation of the expected feature may be weighted to determine the value of the expected feature's characteristic in each fault image. The one or more expected characteristics of the candidate features may comprise one or more of an area or volume of the expected feature and a position of the expected feature within the image.

Figure 5A:
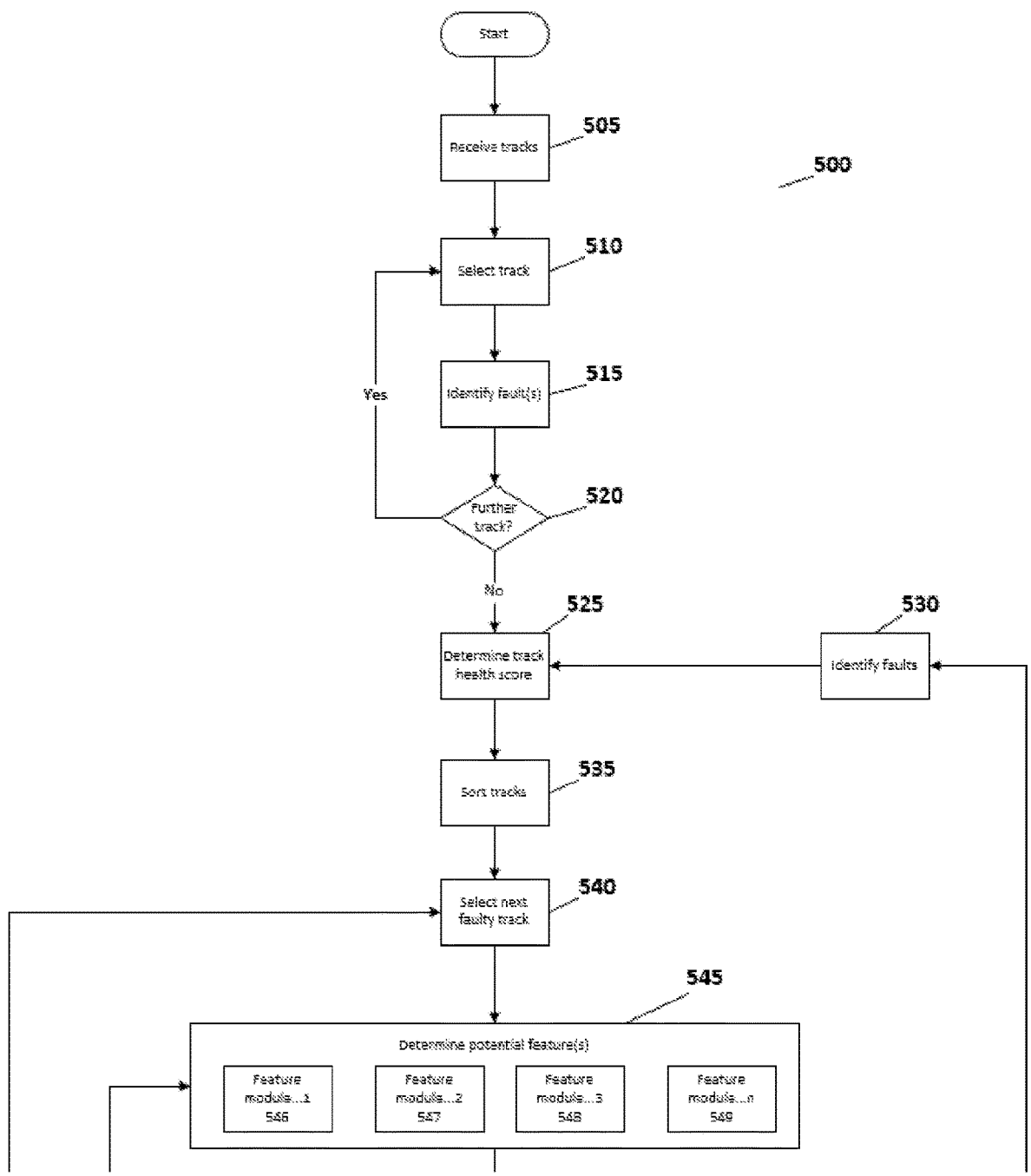
Figure 5B:
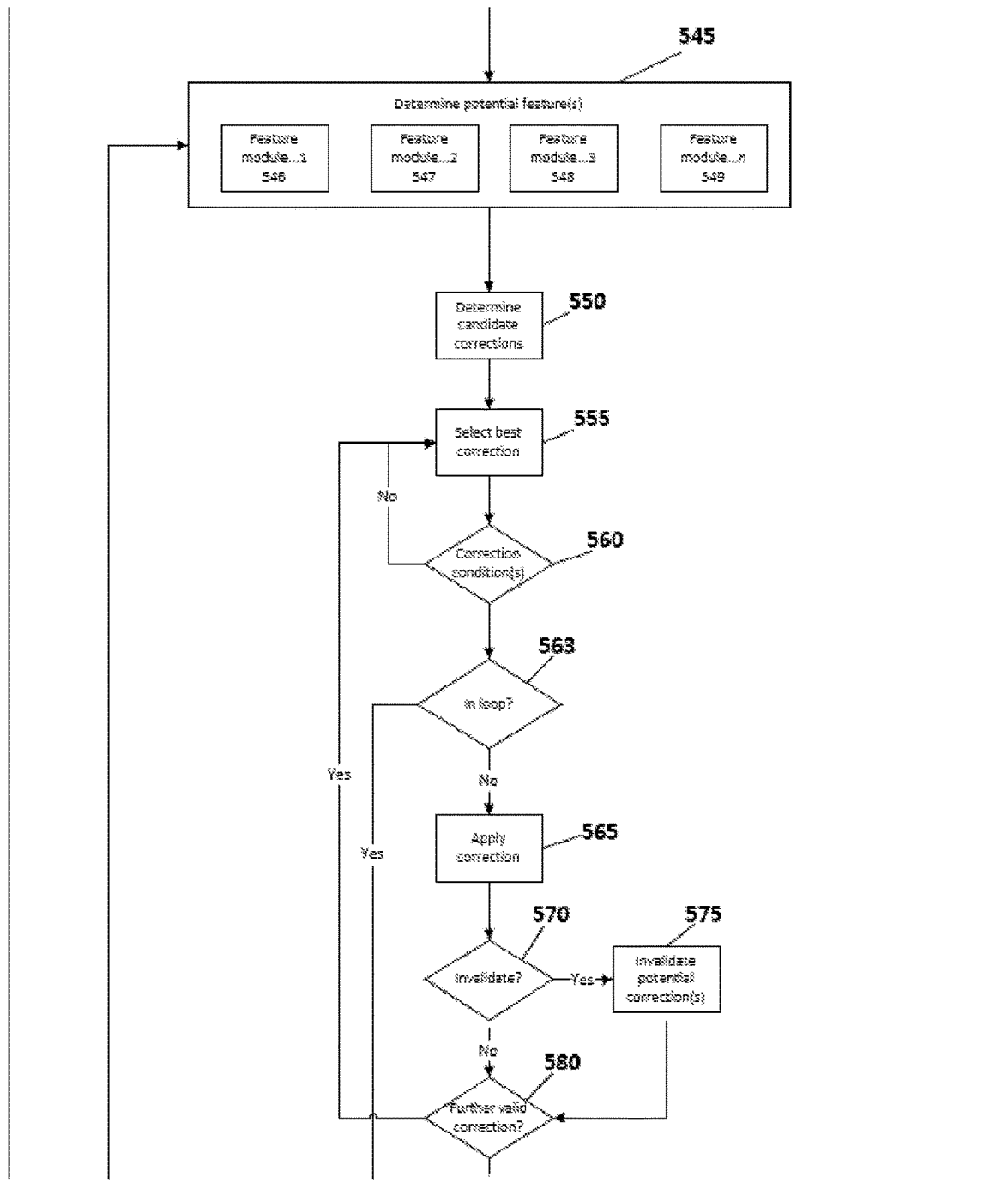
Figure 5C:
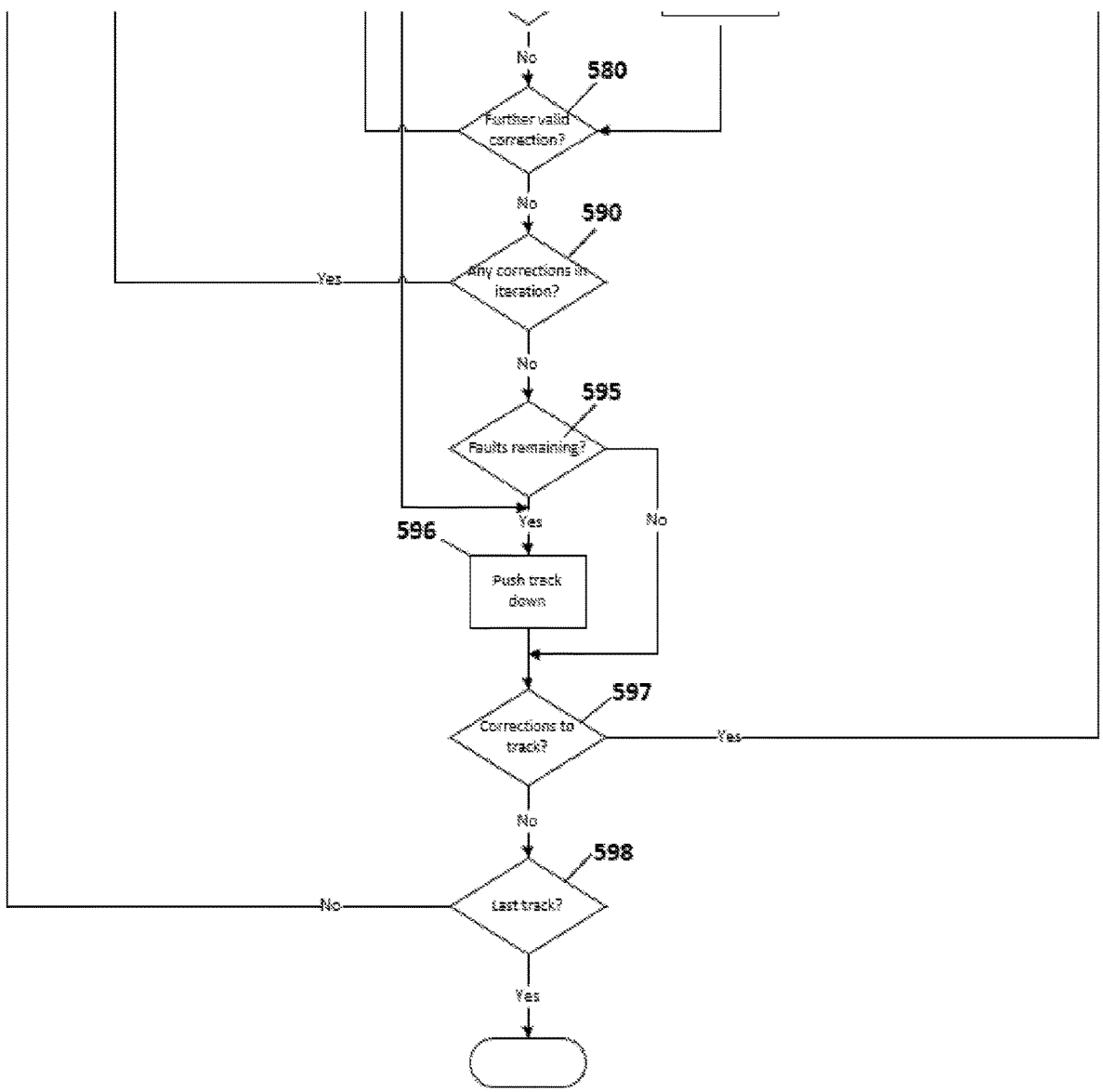

Embodiments of the invention comprise use of one or a plurality of feature modules or feature providers 546, 547, 548, 549 in step 545, as illustrated in FIG. 5*a*. FIG. 5 shows four feature modules 546, 547, 548, 549, although it will be appreciated that embodiments of the invention are not limited in the number of feature modules. Each feature module is operable to identify, if possible, one or more candidate features in a fault image. Each feature module 546, 547, 548, 549 is arranged to identify the one or more candidate features in the fault image in a different manner. Advantageously, by use of the plurality of feature modules 546, 547, 548, 549 operative in different manners enables improved identification of candidate features. As will be explained, some embodiments comprise feature modules 546, 547, 548, 549 which are operable to identify candidate features by one or more of identifying one or more existing features in an image, identifying one or more new features in an image, splitting an existing feature into one or more candidate features, and joining or merging one or more existing features into a candidate feature. Embodiments of these feature modules 546, 547, 548, 549 will be explained with reference to FIGS. 7 to 11 in particular.

Figure 7:
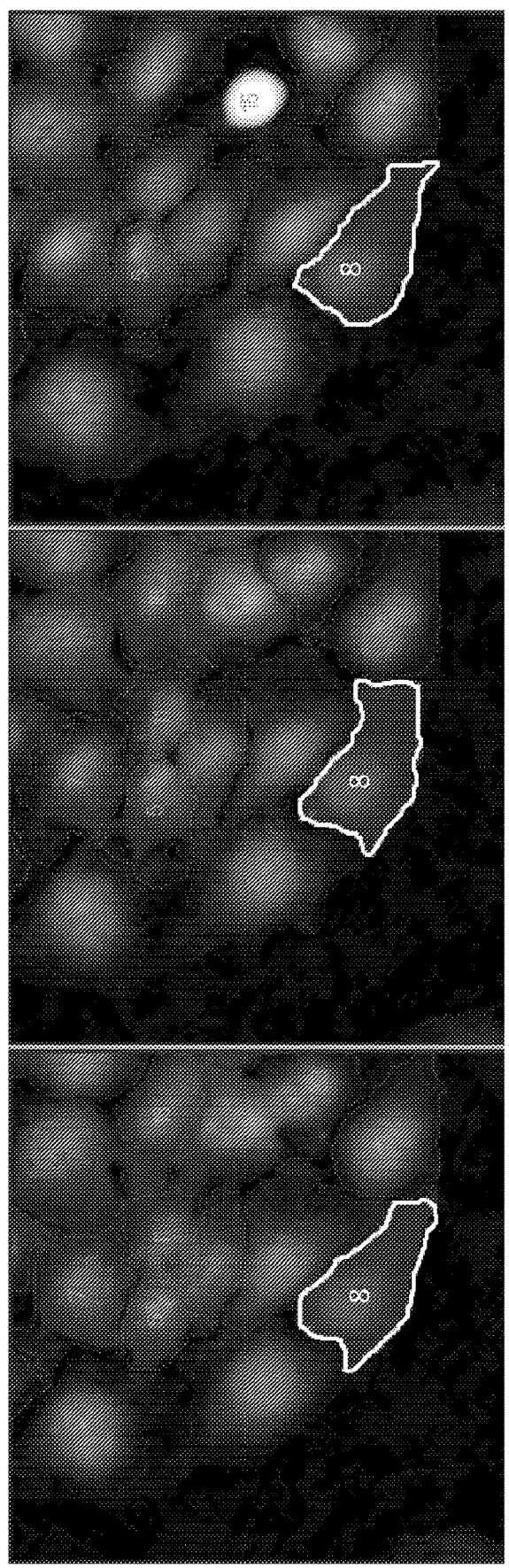
FIG. 7 is a series of images illustrating tracking of an object.

FIG. 7 illustrates three images corresponding to those shown in FIG. 6*a*. In The second image 612 in FIG. 6*a*, a feature was not identified associated with track #8. However, a feature was present in the second image 612 identified with number 74 for which there wasn't sufficient confidence to associate with track #8. An existing feature module 546 in step 590 receives information associated with the expected feature. The information associated with the expected feature may comprise information about an area or volume of the expected feature and a position of the expected feature within the fault image. It will be appreciated that other or additional information may be used. In dependence on the received information associated with the expected feature, the existing feature module 546 is arranged to attempt to identify an existing feature in the fault image.

The existing feature module 546 determines an acceptable range of the candidate feature around the position of the expected feature in the fault image. The acceptable range is used to define an area within the fault image within which the existing feature module is arranged to search for the candidate feature. The acceptable range may be a predetermined range in some embodiments, or may be determined in dependence on one or more features in the fault image.

In some embodiments, the existing feature module 546 is arranged to identify all features within the acceptable range of the position of the expected feature. Features identified as being within the acceptable range are passed or identified to one or more other features providers in some embodiments to aid those feature providers, as will be explained. In some embodiments, the features are identified to one or both of split and merge feature providers.

FIG. 7 illustrates an example where the track #8 is associated with an existing feature by the existing feature module 546. Thus, the existing feature in the second image 612 of FIG. 6*a* may be added to the track #8, as shown in FIG. 7.

In some embodiments of the invention, a new feature module 547 is arranged to identify one or more new features in an image. The new feature module is arranged to perform segmentation of the image to identify new features. The new feature module 547 is arranged to attempt to identify the one or more new features by seedpoint generation and segmentation.

In some embodiments, the new feature module 547 is arranged to check a correspondence between the position of the expected feature in the fault image and an existing feature in the fault image. If there is an existing feature in the fault image corresponding to the position of the expected feature, the new feature module 547 does not attempt to identify a new feature in some embodiments. That is, in some embodiments, the new feature module 547 only attempts to identify a new feature in the fault image if the position of the expected feature is vacant i.e. does not correspond to an existing feature.

The new feature module 547 is arranged to determine a seedpoint in the fault image in dependence on the position of the expected feature. In some embodiments, the seedpoint may be determined as the position of the expected feature. The seedpoint may be provided to a segmentation algorithm, which may be the same segmentation algorithm used originally to segment the plurality of images or may be a different algorithm. The segmentation algorithm may be as described in WO 2016/174472. For example, the segmentation algorithm may perform a fill process based on the seedpoint to identify the new feature. A new feature identified in this way is provided by the new feature module 547.

Some embodiments of the invention comprise a merge feature module 548. The merge feature module 548 is arranged to address errors in seedpoint detection. The merge feature module 548 attempts to merge or combine one or more existing features in a fault image.

As noted above, in some embodiments the merge feature module 548 uses one or more features identified within the acceptable range of the position of the expected feature. These features may be provided by another module, as discussed above, or may be identified by the merge feature module 548. However, sharing features between modules advantageously reduces a computing resource requirement.

The identified features are filtered in some embodiments. The filtering may remove or exclude features not meeting one or more requirements. One requirement may be to remove features in dependence on the area or volume of the expected feature. For example, identified features having an area or volume of greater than 120% or 140% of that of the expected feature, although it will be appreciated that other values may be used. The volume of the feature may be estimated based on a predetermined estimated thickness for the feature i.e. indicative of estimated cell thickness. However, in some embodiments, where the image data is determined in dependence on a coherent diffractive imaging technique (CDI) or a ptychographic technique, an indication of the thickness may be determined in dependence on a phase change of radiation penetrating the object.

The filtering reduces the number of features being considered further to increase efficiency. In this case, if a feature is already, for example, 125% of the volume of the expected feature, then merging with other features to have an increased volume is unlikely to provide a good correction for the fault.

Once the features have been filtered, one or more combinations of features are tested as merge candidates by the merge feature module 548 based on one or more criteria. Combinations of features may be tested, such as sequentially, to determine whether the combination of features have a minimum number of adjacent pixels. If not, the combination is discarded. In some embodiments, features may only be merged if sharing a common boundary. If the features share a common boundary then the combination of features is merged to create a temporary feature. The temporary feature may be considered for further merging with other existing features. The temporary feature may be post-filtered in some embodiments in dependence on the volume of the temporary feature i.e. using the criteria of having an area of greater than 120% or 140% of that of the expected feature, although other values or metrics may be used.

Figure 8B:
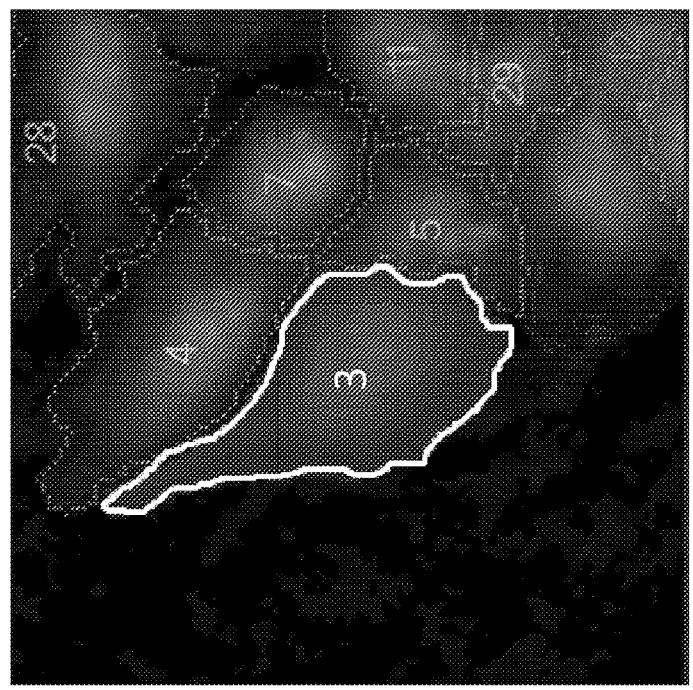
FIG. 8 is images showing merging of features.
Figure 8A:
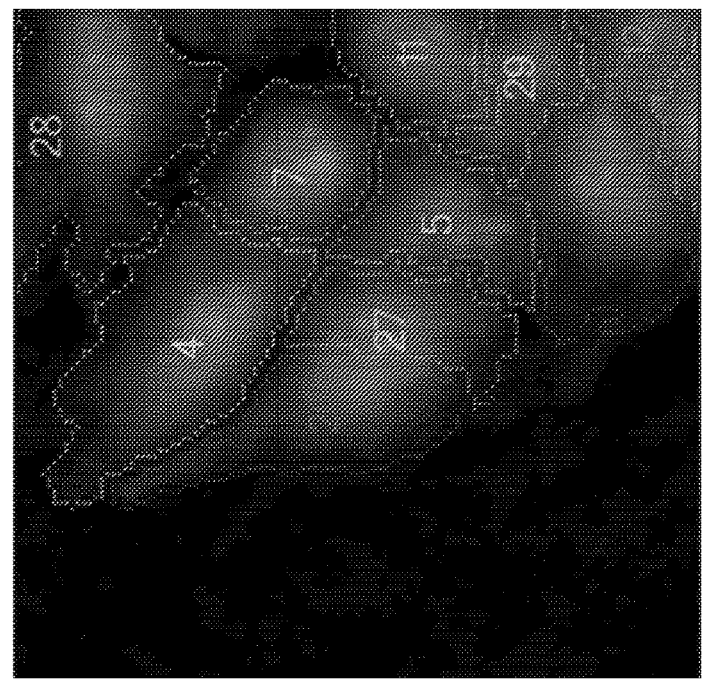

FIG. 8 illustrates merging of a plurality of features. FIG. 8*a* illustrates features identified as 26 & 27 which are merged to form a feature in FIG. 8*b*. The new feature in FIG. 8*b* may then be successfully associated with a track #3 to correct a fault.

Some embodiments of the invention comprise a split feature module 549. The split feature module 549 is arranged to address errors in seedpoint detection. The split feature module attempts to split or divide an existing feature in a fault image to form one or more new features.

In some embodiments the split feature module 549 uses one or more features identified within the acceptable range of the position of the expected feature. These features may be provided by another module, as discussed above, or may be identified by the split feature module 549. Sharing features between modules advantageously reduces a computing resource requirement.

The identified features are filtered in some embodiments. The filtering may remove or exclude features not meeting one or more requirements. One requirement may be to remove features in dependence on the area or volume of the expected feature. For example, identified features not having an area of at least 60% or 80% of the expected feature may be filtered out, although it will be appreciated that other values may be used. If a feature does not already have such sufficient area, then splitting the feature is unlikely to provide a feature as a good candidate for correction.

Figure 9B:
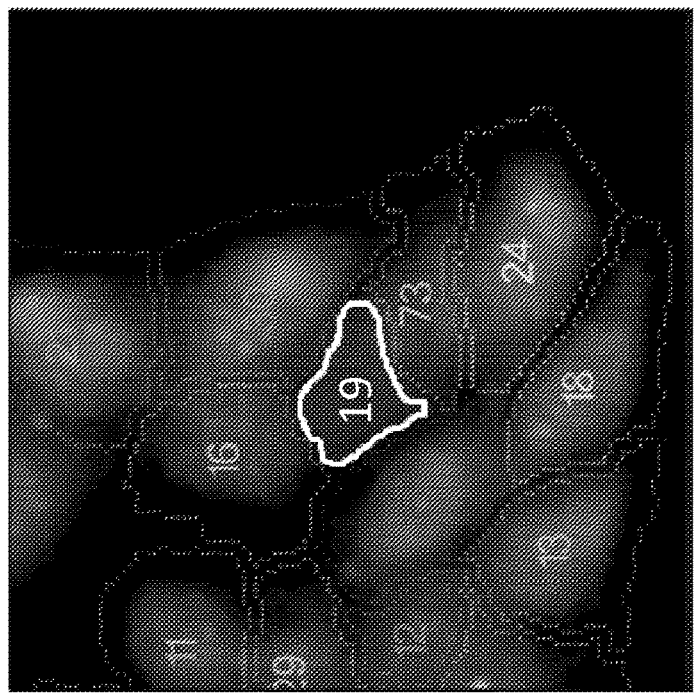
FIG. 9 is images showing a splitting of features.
Figure 9A:
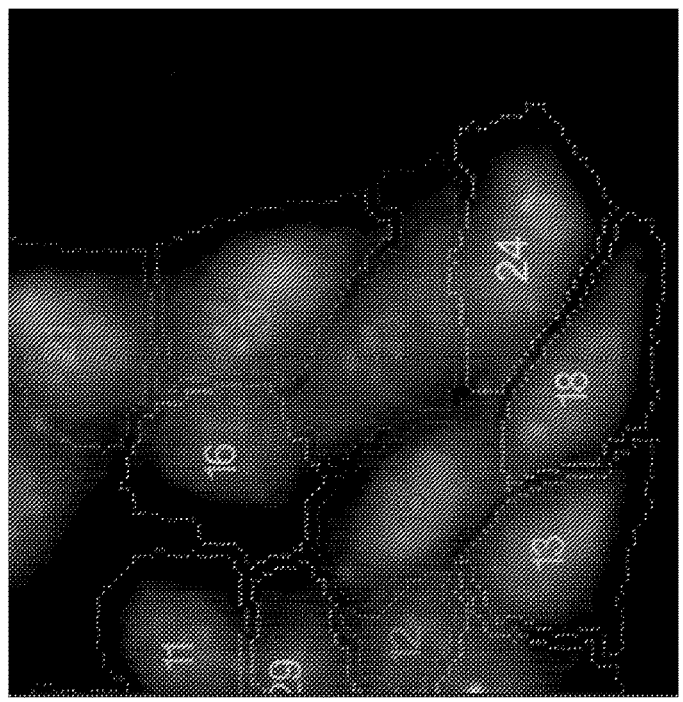

FIG. 9 illustrates splitting of a plurality of features. FIG. 9*a* illustrates a feature identified as 23 which is split to form new features in FIG. 9*b*. The new features are identified as 19 and 73. One of the new features in FIG. 9*b* may then be successfully associated with a track #19 to correct a fault with that track.

Figures 10A, 10B:
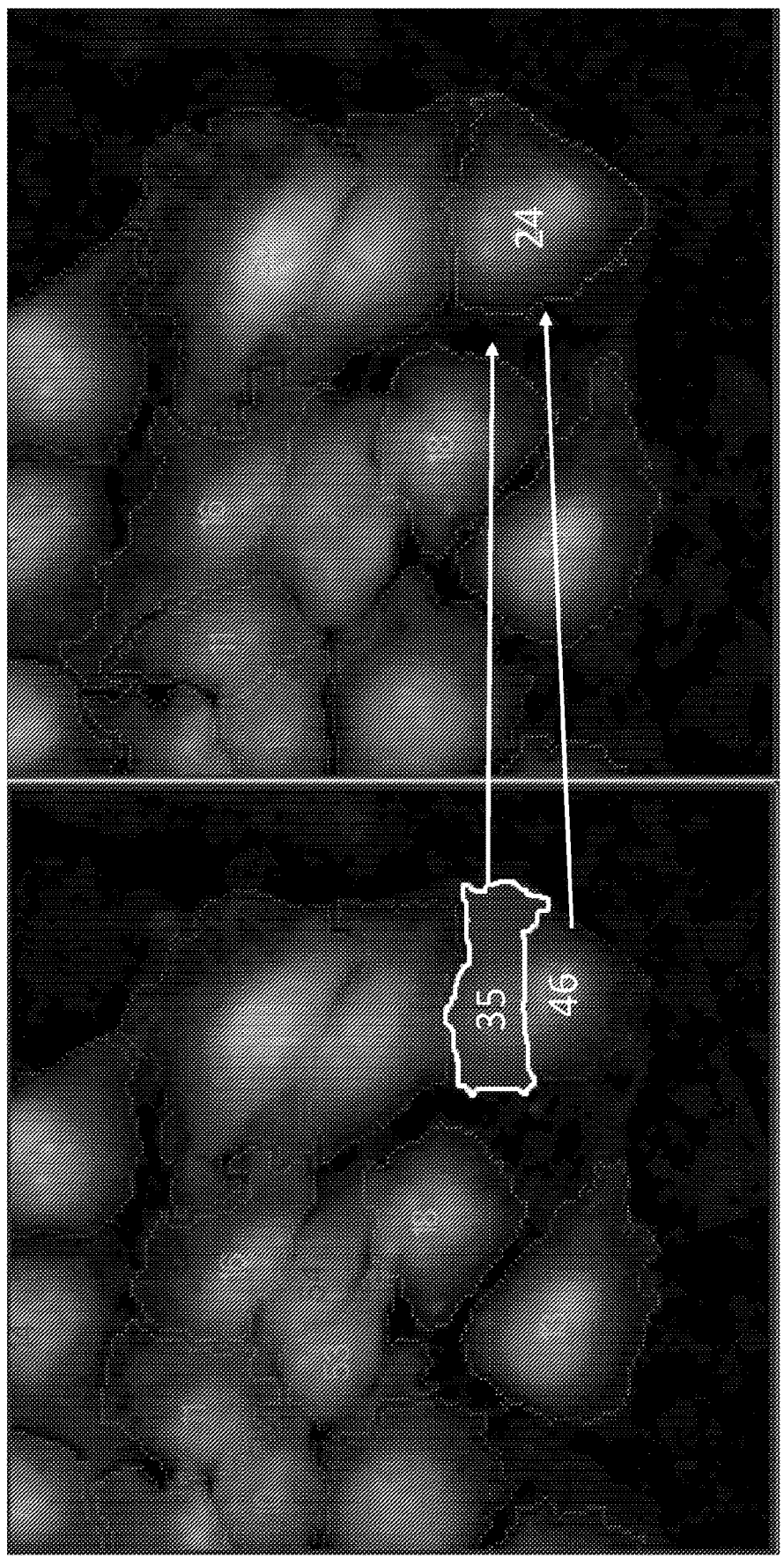
FIG. 10 is images showing a clustering of features.

In some embodiments, although not shown in FIG. 5, embodiments of the invention may comprise a cluster module. The cluster module is arranged to determine when two or more objects cluster together i.e. form a cluster in a subsequent image, such as illustrated in FIGS. 10*a* and 10*b*. In FIG. 10*a* two features forming part of tracks #35 and #46 are determined to cluster together to form a feature identified as #24 in FIG. 10*b*. In a cluster the objects being tracked do not actually join or merge, but instead become inseparable in the image data. That is, the objects may contact together where it is not possible to determine a boundary in the in the image data between the two objects. In such cases, it can be determined that a cluster has been formed, such as in FIG. 10*b*. Thus, two features in a preceding image may become one feature in a subsequent image as illustrated in FIG. 10. It will be appreciated that the features may also de-cluster i.e. where a feature in a preceding image becomes, again, two or more features in a subsequent image when the boundary between the features may be identified, which may also be determined by the cluster module. Thus clustering represents a temporary grouping of a plurality of features, as indicated by the arrows in FIG. 10.

Figures 11A, 11B:
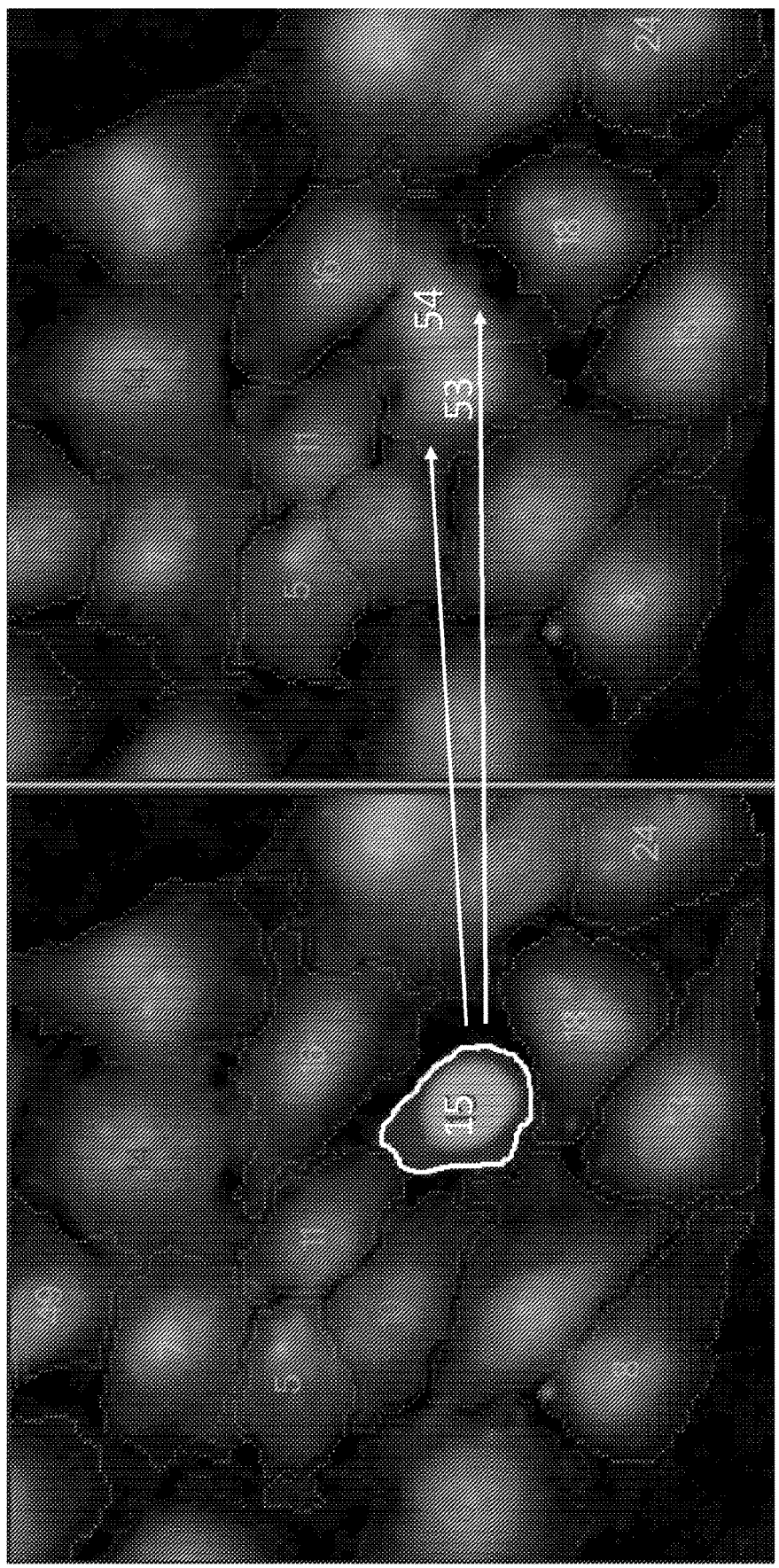
FIG. 11 is images showing mitosis of features.

In some embodiments, although not shown in FIG. 5, embodiments of the invention may comprise a mitosis module. The mitosis module is arranged to determine when a feature undergoes mitosis. Mitosis is when an object, particularly a biological object, undergoes division. The object being tracked divides into two or more daughter objects, such as cells. In FIG. 11*a* a feature identified as part of track #15 undergoes mitosis to divide into two daughter features. The daughter features may then be tracked separately as tracks #53, #54. Therefore the image of FIG. 11*a* represents the termination state of track #15, whilst the image of FIG. 11*b* represents a start state for tracks #53, #54. An indication of the tracks #53, #54 being daughter tracks of track #15 may be associated with one or more of tracks #15, #53 and #54.

As a result of step 545, one or more candidate features are identified for the one or more fault images associated with the selected track.

Step 550 comprises determining one or more candidate corrections for the selected track. In some cases, the candidate correction is associated with at least one of the candidate features determined in step 545. In these cases the one or more candidate features are selected to correct a fault associated with the selected track using the at least one candidate feature. In some cases, a plurality of candidate corrections are determined in step 550 as will be explained. In other cases, the one or more candidate corrections may be associated with determining a state associated with the track, such as a termination state. The termination state is indicative of the track being terminated, which may be due to termination of the object being tracked e.g. death of a biological object, phagocytosis, mitosis, or the object leaving the image.

Considering an example, for a fault associated with the selected track there may be more than one correction which is able to address the fault with the track. For example, a plurality of corrections may be available. In some examples each correction uses a respective, different, feature identified in step 545, although multiple corrections may use the same feature in other examples. For example, where a fault image is absent a feature for the selected track, there may be two different features which may be potentially associated with the track as the missing feature. In this example two different corrections may be used each associated with one of the features. Thus step 550 comprises identifying a plurality, in some cases all of the possible corrections for faults associated with the track. Each correction is associated with a change metric S indicative of a change of the correction to the tracking of the object. As will be explained, the change metrics is indicative of a global change caused by the correction to all of the plurality of tracks, which advantageously helps avoid corrections which improve the selected track but significantly detriment the tracking of other tracks.

In some embodiments the candidate corrections are determined for all faults associated with the selected track. For each of the one or more faults for the selected track, the candidate corrections are determined along with the change metric for each candidate correction. The change metric is used in some embodiments to determine an order in which the candidate corrections are applied to the selected track, as will be explained.

Figure 12:
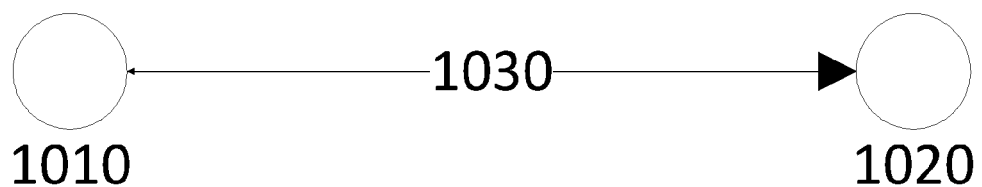
FIG. 12 is an illustration of links between features in a track.
Figure 12:
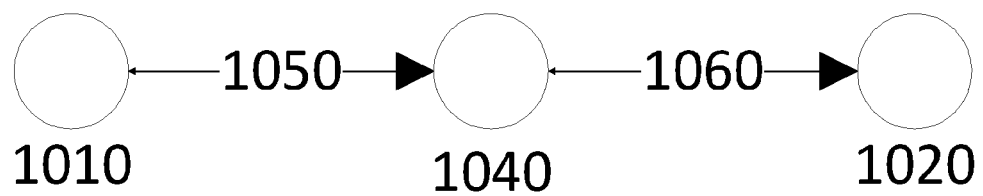

FIG. 12 illustrates a correction to a missing feature fault. Features 1010 and 1020 reside in images (first and third images) adjacent to a fault image (second image) without a feature associated with a track. Therefore, the feature 1010 in the first image is associated with the feature 1020 in the third image. Thus the feature 1010 is directly linked 1030 to the feature 1020 within the track.

A correction is determined based on a new feature 1040 in the second image being introduced to the track which results in feature 1010 being linked 1050 to the new feature 1040 and the new feature 1040 being linked 1060 to the feature 1020. In this correction, the existing link 1030 of the track between first and third images is broken and two new links 1050, 1060 are created such that the track contains features in each of the first to third images.

In some embodiments the change metric S is based upon a change in tracking confidence of links created by the correction i.e. links 1050, 1060 from which is subtracted a change in tracking confidence of links broken by the correction i.e. link 1030. The subtraction of the change owing to broken links advantageously ensures that the change represents global or general in improvement in tracking of the object. Furthermore, by considering broken links embodiments of the invention may avoid entering a loop, wherein some corrections address faults which are then, later, undone by correction of a fault created by the original correction.

In some embodiments S may be calculated as:

$$S = \sqrt[n]{\prod_n TC_{F \to F'}} - \sqrt[m]{\prod_m TC_{F \to F'}}$$

Where n and m are counters for a number of created and broken links, respectively. Thus, for the example in FIG. 10, n=2 and m=1. TC is a value indicative of tracking confidence, which may be as defined in the incorporated reference although other metrics may be used. F and F' are a feature and a subsequent feature, respectively. In the example, of FIG. 12, if feature 1040 was part of another track, links to 1040 in that other track would be broken thereby incurring a score value for each broken link, and new links 1050, 106 created thereby incurring a score for each created link.

The metric S described above may be calculated for first portion indicative of an application of the candidate correction to the respective track. That is, the effect of the candidate correction on the selected track. A second portion is calculated in some embodiments indicative of an effect of the candidate correction to other tracks of the plurality of tracks. The other tracks of the plurality of tracks may be those tracks also affected by the candidate correction. In this way, an overall metric is determined which is indicative of a net effect of the candidate correction on the accuracy of the plurality of tracks. Advantageously candidate corrections may be evaluated according to their overall impact. This may distinguish candidate corrections which, although improving the selected track, may adversely affect other ones of the plurality of tracks, such that the net effect on the tracking accuracy may be negative.

The tracking confidence arising from a link may be calculated in the same way as for the original tracking. In some embodiments, a geometric mean of the tracking confidence may be determined as explained in the incorporated reference. It will be appreciated that other techniques for determining a confidence value may be used, although using the same technique as in the original tracking advantageously avoids it being necessary to perform a conversion between confidence calculations.

In order to ensure that any corrections provide a global improvement where the correction to the selected track provides a general or global improvement to the plurality of tracks i.e. that a correction to a track does not significantly impair other tracks within the plurality of tracks, a global modifier may be applied in determining the change metric S. The change metric includes an effect of the change arising from one or more other tracks affected by the correction. For example, where an existing feature in a fault image is newly associated with a track as a correction, such as in FIGS. 6a & 7, where an existing feature is associated with track #8, the change metric S for track #8 increases, for example by a value of 0.85. However, where the existing feature was associated with another track e.g. track #74, there is a detriment to removing that feature from track #74 to add to track #8. That is an accuracy of the tracking of track #74 may be reduced by a value arising from the broken links in that track associated with the feature, such as a value of −0.6. The change from broken links in track #74 is subtracted from the change in track #8. The net change between tracks #8 and #74 affected by the correction is 0.85−0.6=0.25. Therefore the global modifier accounts for changes to all tracks due to the correction associated with the selected track.

In some embodiments a state change modifier is used. A state is defined as a property of a track in one or more particular circumstances. For example, a track may have an invalid start state or an invalid end state where the track is improperly terminated. Such states are faults as they relate to the termination of the track. An invalid end state may be resolved to correct the fault by determining that the object divided, such as a cell went through mitosis and divided into e.g. two other cells. In this way, the state of the track is changed from the invalid end state to a normal state.

As can be appreciated from the above, for each correction a value indicative of a tracking improvement for the plurality of tracks is determined. Thus, corrections may each be ranked according to their effectiveness or global tracking improvement.

In step 555 a best correction for the selected track is determined. The best correction is determined as one of the candidate corrections for the track determined in step 550 which provides a best overall improvement i.e. is associated with a greatest value of S, after application in some embodiments of one or more modifiers as described above. The best correction for the selected track may be determined as one of the remaining candidate correction which is associated with a best, such as highest, change metric S. In Step 555, the one of the candidate corrections for the selected track from a plurality of corrections for the selected track is selected. The candidate correction is selected in dependence on the metric indicating a greatest improvement in accuracy for the plurality of tracks; that is for all of the tracks. Therefore faults are addressed for the selected track in an order in which the correction improves the tracking for all of the plurality of tracks.

In step 560 it is determined whether the correction meets one or more predetermined conditions. If the correction meets the one or more predetermined conditions, the method 500 moves to step 563.

The one or more predetermined conditions may utilise one or more thresholds. In some embodiments, a change threshold is used, wherein the change threshold defines a minimum change score for the candidate correction. That is, in some embodiments the change threshold is a minimum value of S for the candidate correction. In some embodiments, a new link threshold is used. The new link threshold may be based on new links created, as a portion of the equation described above:

$$\sqrt[n]{\prod_n TC_{F \to F'}}$$

Therefore step 560 comprises selecting one of the candidate corrections for the selected track comprises determining whether the first portion of the metric meets one or more predetermined criteria, as described above.

If, in step 560, the correction does not meet the one or more predetermined conditions then the method returns to step 555. If, however, the correction does satisfy the one or more predetermined conditions then the method moves to step 563. If the correction does not meet the one or more predetermined conditions, the method returns to step 555 where another candidate correction is selected.

In step 563 it is determined, before the correction is applied, whether the method is iterating in a loop. By a loop it is meant that corrections are being re-performed. In order to detect being in a loop, in some embodiments a log is maintained identifying previously performed corrections. If the correction has been applied before, the method 500 determines in step 563 that the method is iterating in a loop. If in such a loop the method moves to step 596, which is explained below. If the method is not iterating in a loop, the method moves to step 565.

In step 565 the selected correction is applied to the selected track and any other tracks to which the correct relates. For example, the correction may involve breaking a link of another track, as described above.

In step 570 it is determined whether the candidate correction invalidates any other potential corrections. That is, whether the candidate correction selected in step 555 invalidates any other candidate corrections determined in step 550. In step 550 each candidate correction is determined individually. However, some candidate corrections may address multiple faults with the selected track. As the method selects the best correction in step 555, those candidate corrections addressing multiple faults will have a higher metric S and thus be selected first. Therefore, when applying the candidate correction, step 570 determines which other candidate corrections determined in step 550 should be invalidated i.e. which are no longer necessary in view of the current candidate correction. If there are candidate corrections to invalidate, the method moves to step 575 where those candidate corrections are invalidated. To invalidate a candidate correction may mean to mark one or more candidate corrections as no longer being relevant or available as candidate corrections. Advantageously the method 500 efficiently only considers candidate corrections which are still relevant.

If no candidate corrections are invalid in step 570, the method moves to step 580 where it is considered whether any other valid corrections remain to be considered. If there remain valid corrections to be considered, the method returns to step 555 where a next candidate correction is considered. Thus, the loop of steps 555 to 580 considers candidate corrections in an order of most improvement to tracking accuracy.

If no further valid corrections remain in step 580, the method 500 moves to step 590.

In step 590 it is checked whether a correction has been made in the current iteration. When a correction has been made to the selected track, it is possible that corrections other than those previously-determined may now be determined. Therefore, if in step 590 it is determined that a correction has been made in the current iteration the method 500 returns to step 545 where candidate features are again identified and, subsequently in step 550 one or more candidate corrections are determined as explained above. Advantageously the method 500 continually, in each iteration, re-determines candidate features and corrections to optimally address faults with the selected track.

If no corrections to the selected track have been made in the current iteration the method moves to step 595 where it is determined whether any faults remain with the selected track. If no faults remain with the selected track in step 595 the method moves to step 597. If faults remain with the selected track, and no corrections were made in the iteration as determined in step 590, the method moves to step 596. Arriving at step 596 indicates that the method is currently unable to address the remaining faults. However the method may be able to subsequently address such faults. In order to allow later consideration of the remaining faults, the method operates in step 596 to push the selected down in an order of consideration. That is, to delay consideration of the track. By delaying consideration of the selected track faults with other tracks of the plurality of tracks may be addressed and, in doing so, may allow the one or more faults with the selected track to be addressed. Therefore further consideration of the selected track is implemented. To implement such delayed consideration, in some embodiments the metric indicative of the number of faults associated with the selected track i.e. H the track health metric in some embodiments may be adjusted to cause a reordering of track consideration to delay the selected track. In some embodiments, the adjustment is to make a temporary change to the length value of the selected track In some embodiments, the adjustment is to add a temporary offset value to the length of the selected track.

However, given there may be a variety of ways in which the metric H may be calculated, in some embodiments the offset may be subtracted from the track length. The offset may be a predetermined value. Once the length value has been changed the metric H is recalculated to cause the delay. In this way, the track is moved down the sorted list determined in step 535.

In step 597 it is determined whether any corrections were made to the track. If corrections were made to the track the method moves to step 530. In step 530 any faults with the selected track are identified. Step 530 is equivalent to step 515. Following step 530 the method moves to step 525 where the metric indicative of the number of faults associated with the selected track i.e. H the track health metric in some embodiments is recalculated.

If in step 597 it is determined that no corrections were made to the selected track, the method moves to step 598. In step 598 it is determined whether the selected track is the last track of the plurality of tracks. If the track is the last track the method 500 ends. If the track is not the last track i.e. tracks remain to be considered, the method moves to step 540 where the next track to be considered is selected as described above.

It will be appreciated that embodiments of the invention determine temporal behaviour of an object. Embodiments of the invention improve an accuracy of tracking one or more objects over a period of time by iteratively addressing faults with track data by selecting corrections for the faults in dependence on an improvement of each correction to a plurality of tracks in the tracking data.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

INDEX—REFERENCE NUMERALS OF FIG. 5

505—Receive tracks
510—Select track
515—Identify fault(s)
520—Further track?
525—Determine track health score
530—Identify faults
535—Sort tracks
540—Select next faulty track
545—Determine potential feature(s)
546—Feature module . . . 1
547—Feature module . . . 2
548—Feature module . . . 3
549—Feature module . . . n
550—Determine candidate corrections
555—Select best correction
560—Correction condition(s)
563—In loop?
565—Apply correction
570—Invalidate?
575—Invalidate potential correction(s)
580—Further valid correction?
590—Any corrections in iteration?
595—Faults remaining?
596—Push track down
597—Corrections to track?
598—Last track?

The invention claimed is:

1. A computer-implemented method of determining temporal behaviour of an object, comprising:
    receiving track data indicative of a plurality of tracks, wherein each track identifies an association between features corresponding to an object in each of a plurality of images forming image data representative of one or more objects;
    identifying, in at least some of the plurality of tracks, one or more faults, wherein each fault is associated with at least one respective fault image of the image data;
    iteratively performing a correction process on the track data, wherein the correction process comprises:
        selecting one of the plurality of tracks having a fault identified therein;
        determining one or more candidate features in each respective fault image, wherein each candidate feature is determined as a candidate for correcting at least one fault associated with one or more of the plurality of tracks;
        determining one or more candidate corrections for the selected track, wherein at least some of the candidate corrections are associated with one or more of the candidate features;
        selecting one of the candidate corrections for the selected track in dependence on a metric indicative of an effect of the candidate correction on an accuracy of the plurality of tracks comprising a first portion indicative of an application of the candidate correction to the respective track and a second portion indicative of an effect of the candidate correction to one or more other tracks of the plurality of tracks; and
        applying the selected candidate correction to the selected track in dependence on one or more criteria.

2. The method of claim 1, wherein the selecting one of the candidate corrections for the selected track comprises determining whether the first portion of the metric meets one or more predetermined criteria.

3. The method of claim 1, wherein the selecting one of the candidate corrections for the selected track comprises selecting one of a plurality of corrections for the selected track in dependence on the metric indicating a greatest improvement in accuracy for the plurality of tracks.

4. The method of claim 1, wherein each track comprises links between features in images of the plurality of images and applying the selected candidate correction comprises one or both of breaking one or more links of the selected track or creating one or more links of the selected track.

5. The method of claim 1, wherein the selecting one of the plurality of tracks having a fault identified therein comprises:
   determining a track quality metric for each track in dependence on a length of each track and a number of faults associated with the track; and
   selecting the one of the plurality of tracks according to the track quality metric for each of the plurality of tracks.

6. The method of claim 1, wherein the iterative process comprises re-determining the one or more candidate features in each respective fault image in dependence on the application of the selected candidate correction to the selected track.

7. The method of claim 6, comprising re-determining the one or more candidate corrections for the selected track.

8. The method of claim 1, wherein the identifying, in at least some of the plurality of tracks, one or more faults comprises determining a type of each fault.

9. The method of claim 8, wherein the type of each fault comprises one of:
   a missing feature fault indicative of a failure of the track to be associated with a feature in the at least one respective fault image; and
   a termination fault indicative of the track having an invalid termination.

10. The method of claim 1, comprising:
   determining whether the applied correction invalidates any other candidate corrections for the selected track; and
   discarding said invalidated other candidate corrections.

11. The method of claim 1, comprising determining whether the selected candidate correction has been applied to the selected track in a current iteration and, if not and one or more faults remain with the selected track, deferring further iterations for the selected track.

12. The method of claim 11, wherein the selecting one of the plurality of tracks having a fault identified therein comprises:
   determining a track quality metric for each track in dependence on a length of each track and a number of faults associated with the track; and
   selecting the one of the plurality of tracks according to the track quality metric for each of the plurality of tracks;
   wherein the deferring comprises adjusting a length of the selected track to defer selection of the selected track for a next iteration.

13. The method of claim 1, comprising selecting another one of the plurality of tracks having a fault identified therein according to one or more predetermined criteria.

14. The method of claim 1, comprising determining whether to terminate the iterative method according to one or more predetermined criteria.

15. The method of claim 14, wherein the one or more predetermined criteria comprise determining if any corrections were made to the selected track.

16. The method of claim 14, comprising determining whether the selected track is a last one of the plurality of tracks.

17. The method of claim 1, wherein at least some of the candidate corrections comprise determining a termination state associated with a feature.

18. A computer-readable data storage medium having instructions tangibly stored thereon which, when executed by a computer, perform the method of claim 1.

19. An apparatus for determining the temporal behaviour of an object, comprising:
   an image detection means arranged detect radiation emitted from a radiation source;
   a computing device comprising:
      a processor; and
      a memory;
   wherein the processor is arranged to perform the method of claim 1.

* * * * *